United States Patent
Goldstein (10) Patent No.: US 10,869,177 B2
(45) Date of Patent: *Dec. 15, 2020

(54) METHODS AND SYSTEMS FOR ESTABLISHING AND MAINTAINING PRESENCE INFORMATION OF NEIGHBORING BLUETOOTH DEVICES

(71) Applicant: Staton Techiya, LLC, Delray Beach, FL (US)

(72) Inventor: Steven Wayne Goldstein, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,534

(22) Filed: Aug. 30, 2019

(65) Prior Publication Data

US 2019/0387385 A1    Dec. 19, 2019

Related U.S. Application Data

(63) Continuation of application No. 14/507,784, filed on Oct. 6, 2014, now Pat. No. 10,405,163.

(60) Provisional application No. 61/887,437, filed on Oct. 6, 2013.

(51) Int. Cl.
| | | |
|---|---|---|
| *H04W 4/80* | (2018.01) | |
| *H04W 4/21* | (2018.01) | |
| *H04L 29/08* | (2006.01) | |
| *H04M 1/725* | (2006.01) | |
| *H04W 84/18* | (2009.01) | |

(52) U.S. Cl.
CPC ............... *H04W 4/80* (2018.02); *H04L 67/24* (2013.01); *H04M 1/7253* (2013.01); *H04W 4/21* (2018.02); *H04M 2250/02* (2013.01); *H04M 2250/12* (2013.01); *H04W 84/18* (2013.01)

(58) Field of Classification Search
CPC ......... H04W 4/80; H04W 4/21; H04W 84/18; H04L 67/24; H04M 1/7253; H04M 2250/02; H04M 2250/12
USPC ....................................... 455/41.2
See application file for complete search history.

(56) References Cited

U.S. PATENT DOCUMENTS

| | | | |
|---|---|---|---|
| 5,499,288 | A | 3/1996 | Hunt et al. |
| 5,732,077 | A | 3/1998 | Whitehead |
| 5,897,616 | A | 4/1999 | Kanevsky et al. |
| 6,356,868 | B1 | 5/2002 | Yuschik et al. |
| 6,882,971 | B2 | 4/2005 | Craner |
| 7,024,359 | B2 | 4/2006 | Chang et al. |
| 7,224,981 | B2 | 5/2007 | Deisher et al. |

(Continued)

FOREIGN PATENT DOCUMENTS

WO    1986005618    9/1986

*Primary Examiner* — Sonny Trinh
(74) *Attorney, Agent, or Firm* — Akerman LLP; Peter A. Chiabotti; Mammen (Roy) P. Zachariah, Jr.

(57) ABSTRACT

A communication device and method can include one or more processors operatively coupled to memory, a sensor and an output device, where the one or more processors to perform operations of discovering neighboring short range communication enabled devices such as Bluetooth LE devices, creating presence lists from the discovered devices, and transferring biometric and personal data at least to or from the communication device or at least to or from one of the discovered devices. Other embodiments are disclosed.

20 Claims, 8 Drawing Sheets

(56) References Cited

U.S. PATENT DOCUMENTS

| | | |
|---|---|---|
| 7,299,177 B2 | 11/2007 | Broman et al. |
| 7,970,611 B2 | 6/2011 | Kuppuswamy et al. |
| 8,050,917 B2 | 11/2011 | Caspi et al. |
| 8,078,463 B2 | 12/2011 | Wasserblat et al. |
| 8,214,208 B2 | 7/2012 | Mallet et al. |
| 8,315,366 B2 | 11/2012 | Basart et al. |
| 8,347,247 B2 | 1/2013 | Harrington |
| 8,554,562 B2 | 10/2013 | Aronowitz |
| 8,554,563 B2 | 10/2013 | Aronowitz |
| 8,719,019 B2 | 5/2014 | Do et al. |
| 8,953,566 B2 * | 2/2015 | Hegde ............... H04W 88/10 370/338 |
| 9,014,546 B2 * | 4/2015 | Shimy ............ H04N 21/42201 386/296 |
| 9,247,427 B2 | 1/2016 | Perez |
| 2002/0143540 A1 | 10/2002 | Malayath et al. |
| 2009/0018826 A1 | 1/2009 | Berlin |
| 2009/0181653 A1 * | 7/2009 | Alharayeri ............ H04L 67/28 455/414.1 |
| 2012/0191780 A1 * | 7/2012 | Sato ..................... H04L 41/082 709/204 |
| 2013/0144623 A1 | 6/2013 | Lord et al. |
| 2013/0167207 A1 | 6/2013 | Davis et al. |
| 2013/0185654 A1 | 7/2013 | Harris et al. |
| 2013/0198694 A1 | 8/2013 | Rahman et al. |
| 2013/0210461 A1 | 8/2013 | Moldavsky et al. |
| 2014/0281320 A1 | 9/2014 | Sun |
| 2014/0333414 A1 | 11/2014 | Kursun |
| 2015/0099550 A1 * | 4/2015 | Alharayeri ............ H04L 51/00 455/456.3 |

\* cited by examiner

Fig. 1    Phase 1: Survey surroundings

Fig.2 Phase 2: create a list of close neighbors and request more information from them Fig.3: Phase 3: Switch on the opposite mode and let neighbors make the same discovery operation (Phase 1 and 2)

| Device Address | MAC, address of BLE device |
|---|---|
| Address Type | Public/Private |
| Device User ID | reference to external DB |
| Advertise TX level | Used to fine nearby devices |
| RSSI | Used to fine nearby devices |

Fig. 4a: *"Short Report" Data*  [401]

| Container Ver. | Field defines a data structure |
|---|---|
| Data Structure | Version specific data |

Fig. 4b: Information Container *Structure*  [402]

| Device Address | MAC, address of BLE device |
|---|---|
| Address Type | Public/Private |
| Device User ID | reference to external DB |
| Adv. TX level | Used to fine nearby devices |
| RSSI | Used to fine nearby devices |
|  | Version controlled data |
| Container Ver. | 1.0 |
| User Name | User Name |
| User Photo | User Picture (LinkedIn size) |
| Affiliation | Company/Social Media |
| Phone | Contact phone |
| Email | Contact Email |

Fig. 4c: *"Extended Report" Data Example*  [403]

Fig.5    Participating BLE Device States and Transitions

Fig. 6: Discovery of customer Ralph's UUID by Business B

Fig. 7: Mary(Y) and Ralph (X) discover their presence via UUID scan

METHODS AND SYSTEMS FOR ESTABLISHING AND MAINTAINING PRESENCE INFORMATION OF NEIGHBORING BLUETOOTH DEVICES

CROSS-REFERENCE TO RELATED APPLICATION(S)

This application is a continuation of U.S. patent application Ser. No. 14/507,784, filed on Oct. 6, 2014, which claims the priority benefit of Provisional Patent Application No. 61/887,437 filed on Oct. 6, 2013, the entire contents of which are incorporated herein by reference in their entirety.

FIELD OF THE INVENTION

The invention herein disclosed generally refers to methods and systems for networking Bluetooth LE enabled devices and creating a presence list(s) and data base(s) reflecting the position of neighboring devices in support of social networking, social media, private use cases, commercial business transactions and government use cases.

BACKGROUND OF THE INVENTION

Whether at business related events (e.g. trade shows, meetings, conferences) or social gatherings (e.g. wedding receptions, party celebrations, bars) or educational lectures situations often arise where people meet for the first time or cannot remember the names of participants they have met before or would like to have more background information of their conversation partners or of the people around them.

At the same time, people are using social media to interact with other people, and those media involve not only a communications path, but also an identity of the other participant and information about him/her which is made available via the web or other interconnection medium. In face-to-face interactions with other people it is often of interest to know the identity and other information about the people engaging in the interchange.

BRIEF DESCRIPTION OF THE FIGURES

The embodiments and the following detailed description thereof may be understood by reference to the following figures.

All documents referenced herein are hereby incorporated by reference.

DETAILED DESCRIPTION

Digitally enabled social media is being used to share information under terms of engagement as parties see fit. This is made possible as all the parties operate in a virtual environment. Any party may choose to connect on their terms and their time line. In other words, users who choose to connect or engage, do so wherever and whenever they want. As a consequence, social media has spawned a set of new barriers and threats. Is the focus now on communication quantity versus quality? Is there a focus on superficiality versus authenticity? In fact, social media has the potential to make us less social; a surrogate for the real thing.

As human beings, our only real method of connection is through authentic communication. Studies attributable to Professor Albert Mehrabian of UCLA suggest that only 7% of communication is based on the written or verbal word and 93% is based on nonverbal language. This would mean that 93% of face-to-face communication is conveyed through body language which cannot be transmitted through the internet and can only partially be conveyed through the phone. Indeed, it's only when we can hear the tone of a voice or look into someone's eyes that we're able to know when "I'm fine" doesn't mean they're fine at all.

Contrast social engagement to traditional face-to-face settings, where the users are physically present. Actively engaging in social roles helps people build self-esteem, physical wellness and a sense of commitment to the community around them. Furthermore, face-to-face encounters provide for both verbal and body cues communications involving, facial expressions, hand gestures, gentle touch on the shoulder and eye contact. In addition, face-to-face communication provides for responses to be immediate, rather than dealing with the delays from texts or e-mails and people are more likely to say what comes from the heart when they spend less time analyzing their response.

Face-to-face is often an ideal form of communications for these and other reasons but often requires a commitment of personal organization to pre-determine a location and time to meet. In our busy society, the availability of ones time is often in conflict with other obligations. A solution would take advantage of spontaneously knowing where interesting or other interested people might be with respect to your proximity and to learn more about them through digital social media.

By definition, society would benefit from a technology that would both leverage the efficiency of a computer-mediated communication platform but focused on the intent of establishing and enhancing face-face encounters; while expanding the opportunity to know of others in your proximity and who may have a similar interest to you. The present embodiments facilitate for the potential of improving both the quality of quantity of face-to-face interactions by identifying existing contacts and or potential new contacts who may be within a predetermined physical proximity.

Retail business could benefit tremendously from the knowledge and awareness of an approaching customer, what the customer is looking for, whether the customer has been at the business before and how often, the name and possibly a picture of the customer, and the ability to advertise to the customer the availability and price of the merchandise that is on their mind. Some of the embodiments herein intend to provide such level of customer insight.

Some people visit bar type entertainment businesses to meet other people and to socialize. In case one's attention is drawn to a particular person in that environment, it would be desirable to learn some details about that person including the name and other personal details that are publically available on social media sites or details that the target person has resident on his or her communication device and permitted to be shared. Further, it may be desirable to obtain similar information about other patrons in a certain vicinity of one's communication device. Some of the embodiments herein intend to provide presence information in such a surrounding and deliver this information via visual display on a mobile communication device.

On college campuses, class sizes have become rather large. As a result the anonymity among students and teachers has grown to a point that a teacher may no longer be familiar with a particular student's name and performance, whether the student is new or has attended the class before, or whether the student has a project completion due. Some embodiments herein can provide presence information, i.e. localization along with personal information and history information about present students to aid the teacher in their interactions with the class. In addition, this data can be delivered via visual display on the teacher's mobile communication device or other computer system.

In a sports arena or venue, before or during a game it may be desirable locating and communicating with friends and family or other people of interest. Further, after locating and identifying a friend, a family member or a person of interest it may be desirable to contact that person using social media tools. This invention is intended to provide presence information about the surrounding stadium visitors including their location along with personal information and displayed on a mobile communication device, and to provide the ability to make contact with a person of interest using social media communications.

The use of social media sites promotes the establishment of virtual relationships where each participant has control over their personal information that is disclosed on the associated websites. As a result the participants in a social media communication have a partial view of people they are communicating with. People tend to form virtual communities comprising fellow members in fitness clubs, interest groups, churches, work environment, and similar. It may be desirable that in case members of such a virtual community are in a certain physical proximity that their mobile devices provide an alert and offer information regarding an approaching fellow member or friend comprising a name, a photo, and personal data, and possibly an acoustical sonification indicating a level of proximity and direction. Some embodiments herein provide this level of intelligence.

Bluetooth low energy, also known as Bluetooth 4.0 (BT 4.0), BLE, Bluetooth LE, or Bluetooth Smart, is a Bluetooth standard that is designed for ultra-low energy sensors requiring very little power. Some of the Bluetooth low energy devices that are already available include a variety of sports fitness sensors. In some embodiments, Bluetooth 4.0 is used in a meshed network configuration to connected personal communication devices and to exchange certain specific data relating to the owner of the device. This data is uploaded to a cloud based computing environment for forensic analysis and is used to complement a voice identification process and to achieve authentication quality, to create a presence database reflecting other BT 4.0 enabled devices in proximity of a discovering device, collecting personal data permitted for sharing, and enable social media communication with the newly detected devices. In addition, BT 4.0 RSSI signal strength is used to compute the distance between two nodes and device triangulation is used to aid in the localization of neighboring devices. Although BLE devices are shown herein as an exemplary device, other short range communication protocols can be adapted to perform similar functions and the embodiments herein are not necessarily limited to BLE enabled devices.

U.S. patent application Ser. No. 14/475,556 describes Methods and Systems for a Voice Verification and Authentication Service, incorporated herein by reference. Application Ser. No. 14/475,556 describes assisting with identification of multiple speaking people in real time situations. In particular, the method and systems disclosed may provide for prequalification for Voice ID in conjunction with single/multi modality verification and validation systems by narrowing the search space to increase the probability of a hit and the quality of the verification and validation results in terms of matching probability.

A variety of biometric sensors & detectors are used for security and access control management. Biometrics refers to methods for recognizing individual people based on unique physical and behavioral characteristics. Many physical characteristics can be scanned by a biometric sensor which can scan for example, eyes, fingerprints, or DNA in order to verify a user and authenticate their identity. In this sense, biometric sensors may be able to benefit from a prequalification provided by the embodiments herein.

A wide range of mobile applications has become available to aid and promote social media communications and interactions. One example comprises beacon-based applications that merchants use to detect approaching customers, to learn about a customer's desire for a particular product, or to advertise buying opportunities to a customer. A further example comprises mobile applications that entertainment and restaurant businesses may use to provide premium service to their customers, or in a sport venue a mobile application may be downloaded to a visitor's mobile device to provide event related information and communications. In some embodiments, aggregation of the customer specific information and data accumulated by the multitude of said social applications can further provide for forensic analysis of this data for example in support of commercial business. Some embodiments herein provide a social media aggregation engine and database that may be used to obtain such detailed information about the behaviors of a customer of interest.

The convergence of the social media interactivity and the ability of speaker identification/verification systems offers a unique capability to deliver talker specific information to the listener in many situations. This information can be delivered via visual display, on a cell phone, pad, or computer devices. Some embodiments herein can assist in the verification, authentication, and localization of the talker and other persons in proximity.

It is conceivable that some embodiments can be applied to environments and systems that comprise advanced glasses (such as Google Glass), earphones, headphones, watches, or acoustical transducers.

Methods, program products, and systems disclosed herein provide for social media networking solutions based on scanning and discovering Bluetooth LE (BLE) enabled devices and creating presence lists of discovered devices and their user's personal data comprising:

1. A local presence list residing on a BLE scanning device reflecting discovered devices and personal user data obtained from devices in BLE communication range.
2. A local presence list where devices on the list are further categorized into nearby devices and present devices based on the Received Signal Strength Indicator (RSSI) value.
3. A central user presence database populated by BLE discovered users comprising an accumulative list of present users across a multitude of devices as well as entries for previously known users that have been identified in the past but are no longer on any device's presence list The mobile instrument can store all the discovered devices without the necessity to communicate with a cloud-based database, such system being self-organizing.

4. In an embodiment the central user database may be accessed through cloud-based communications and may be used to obtain present user information as well as historical user information, for example but not limited to:
   a. Device specific data
   b. User Name
   c. User Picture
   d. Company/Social Media
   e. Contact phone
   f. Contact Email
   g. Location In an embodiment, the central database may be functioning as a social media aggregation engine and database, gathering data about individuals from social media applications as used for example, but not limited to, in retail business, entertainment and/or sports events where they are used to provide customers with a premium service and communications, where the gathered data may be analyzed using forensic software programs and the results may be offered to, for example, commercial customers to make better-informed advertisements and decisions when serving their clientele.

In an embodiment the central social media aggregation database may be used to keep track of where a person goes, and how much time an individual spends in a monitored location and provide this data in a form of a histogram showing in chronological order the time-location trace of an individual.

Further in an embodiment, the social media aggregation database may be used for on-demand interrogation of individuals in order to learn about their whereabouts, where they spent their time, where they are currently located, and other similar information.

In an embodiment, the social media aggregation database can be used to identify a multitude of individuals (swarm) who display similar or same behavioral patterns for example in a shopping mall and provide progressive information of their movements.

In an embodiment, the social media aggregation database system may use web crawling techniques to obtain social media data from a multitude of social media sites.

Further in an embodiment of the invention, when customers download and install social media applications, a cookie can be installed on the customer's communication device to prompt for permission for the application to upload social and behavioral data to the social media aggregation data base.

In an embodiment the central user database can be accessed through cloud-based communications and the data may be used to obtain present user information and behavior as well as historical user information and behavior, which may be used by forensic analysis programs to derive behavior profiles of users.

In an embodiment, a software program component (SPC) is installed on BLE devices to support the scanning and data exchange process through broadcasting and responding to an application-specific BLE type UUID, comprising
   a. A Candidate Presence List (CPL) software program to create, maintain, and update presence lists
   b. A Configuration Application Program Interface (API) logically coupled with the CPL program facilitating provisioning of static data for advertising and other system parameters, and setting a user's profile information for sharing upon request from other devices.
   c. A mode change API logically coupled with the CPL program facilitating controlling the mode of operation, which can be scanning for candidates or advertising (broadcasting) to be discovered.
   d. CPL output API providing a list of present devices with all required ID information used for further processing.

In one embodiment the SPC application installed on a BLE enabled device may recognize SPC enabled BLE devices in communication range and alert the user with visual and textual displays comprising the name and picture of users of the detected devices and it can issue an acoustical sonification indicating an approximate distance to a discovered device.

In an embodiment, a BLE device alternately enters a broadcasting mode and a listening mode to survey surroundings, create a presence list, and request more data from discovered neighbors.

In an embodiment, a BLE UUID receiving device evaluates the RSSI indicator and calculates the distance to the broadcasting device based on the formula $RSSI[dbm]=-(10n \log 10(d)-A)$ where d is the distance and A is the offset which is the measured RSSI 1 meter point away from the BLE device.

Further in an embodiment, a calculated distance to a broadcasting device is used to classify a corresponding entry in the presence list as "nearby" if the measured value is less than a specified threshold.

In an embodiment, BLE based device triangulation in combination with an RSSI evaluation may be used to determine the position of a BLE device. In an embodiment, the system can be set to discover any number of participants within a specific area. Furthermore, the system can inform the user of approaching users.

In an embodiment, some embodiments can be applied to a Voice Identification and Authentication Service as described in U.S. Non-Provisional application Ser. No. 14/475,556 to assist with identification of multiple speaking people in a real time situation. The method and systems disclosed therein can provide for prequalification for Voice ID in conjunction with single/multi modality verification and validation systems by narrowing the search space to increase the probability of a hit and the quality of the verification and validation results in terms of matching probability.

Upon establishing a presence list comprising a multitude of biometric and personal data, the application software can control the device to obtain voice signatures for each candidate on the nearby presence list by accessing a remote server using a TCP/IP connection specifying an optimized search field based on the data obtained through BLE UUID based communications.

The features of the embodiments, which are believed to be novel, are set forth with particularity in the appended claims. The embodiments may best be understood by reference to the description, taken in conjunction with the accompanying drawings While the specification concludes with the claims defining the features of the embodiments that are regarded as novel, it is believed that the embodiments may be better understood from a consideration of the following description in conjunction with the drawings figures, in which like reference numerals are carried forward.

The terms and phrases used herein are not intended to be limiting but rather to provide an understandable description of the embodiments.

The terms "a" or "an", as used herein, are defied as one or more than one.

The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

Architecture and Operation

Figure 1:
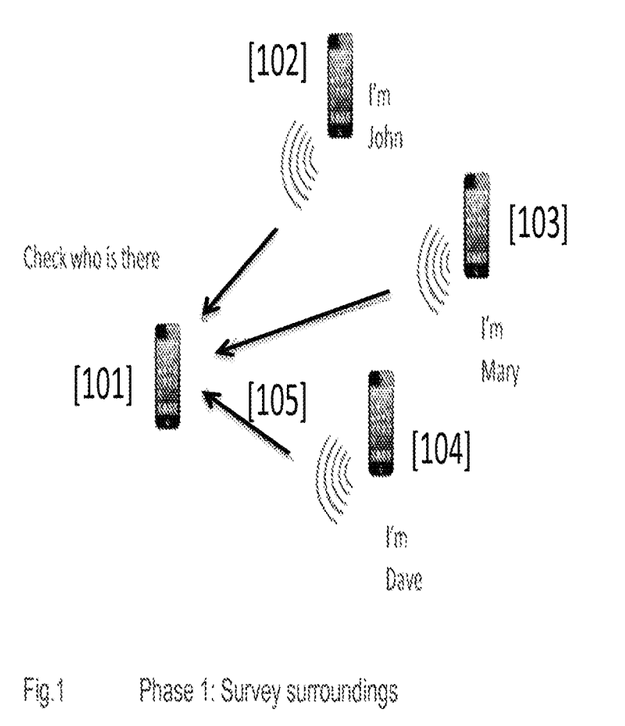
FIG. 1 depicts a scenario where a Bluetooth 4.0 or BT 4.0 or Bluetooth Low Energy or BLE device [101] is scanning the environment to discover other BLE devices in accordance with the embodiments.
Figure 4A:
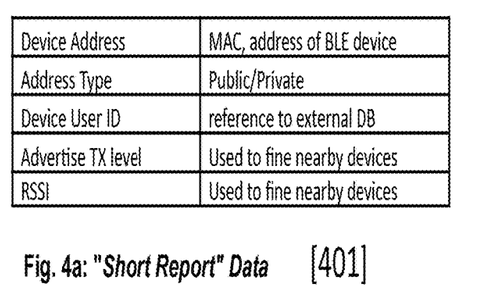
FIGS. 4a, 4b, and 4c depict the data layout for short and extended reports in accordance with the embodiments.

FIG. 1 illustrates a realization of a Bluetooth 4.0 LE meshed ad-hoc network according to an embodiment of the present invention. The diagram depicted belongs to a series of figures describing system architecture in relevance to the software application's operation and identification of potential speakers in the vicinity of a user's device. User device (101) has started its BLE scan and is listening for UUID broadcasts from other devices. In the example shown user devices 102, 103, and 104 are broadcasting their device identifications in form of a UUID. The data package transported via in the UUID is referred to as a "Short Report" data package 401 which can include a device address, an address type, a device user ID, an advertised transmit level, and an RSSI. FIG. 4*a* provides an example of a short report. Based on received advertising information (UUID) from the broadcasting devices, device 101 updates its device presence list to include discovered devices and to remove devices no longer found during the last scan. The latter information is used to create a disappeared device list which includes nearby devices and present devices and which may be reported upon demand.

Further to FIG. 1, device 101 evaluates Advertised TX power and RSSI and calculates a distance to the broadcasting devices. The result is compared with a pre-specified distance value. If the calculated distance is equal or less than the pre-defined value, the broadcasting device is assigned the attribute "nearby device" which is recorded in the presence list. If the calculated distance is greater than the predefined distance value, then the device is categorized as "present device", which is recorded in the presence list.

Further to FIG. 1, based on received advertising information from the broadcasting devices, device 101 updates its device presence list by validating what listed existing "nearby devices" are maintaining their attribute based on proximity criteria (Advertised TX power vs. Received RSSI Level), otherwise their attribute is changed to "present device".

Further to FIG. 1, based on received advertising information from the broadcasting devices, device 101 updates its device presence list by validating what listed existing "present devices" meet the proximity criteria (Adv TX power vs. Received RSSI Level); in that case, their attribute in the presence list is changed to "nearby device".

Further to FIG. 1, based on received advertising information from broadcasting devices, device 101 updates its device presence list to add new devices discovered during the last scan and to assign the "nearby device" attribute to devices that meet the proximity criteria (Advertised TX power vs. Received RSSI Level); all other new devices by default have the "present device" attribute in the presence list.

Further to FIG. 1, device 101 may create a list of known nearby devices with information extracted from the corresponding advertising payload only (short report) and report it upon demand.

Figure 2:
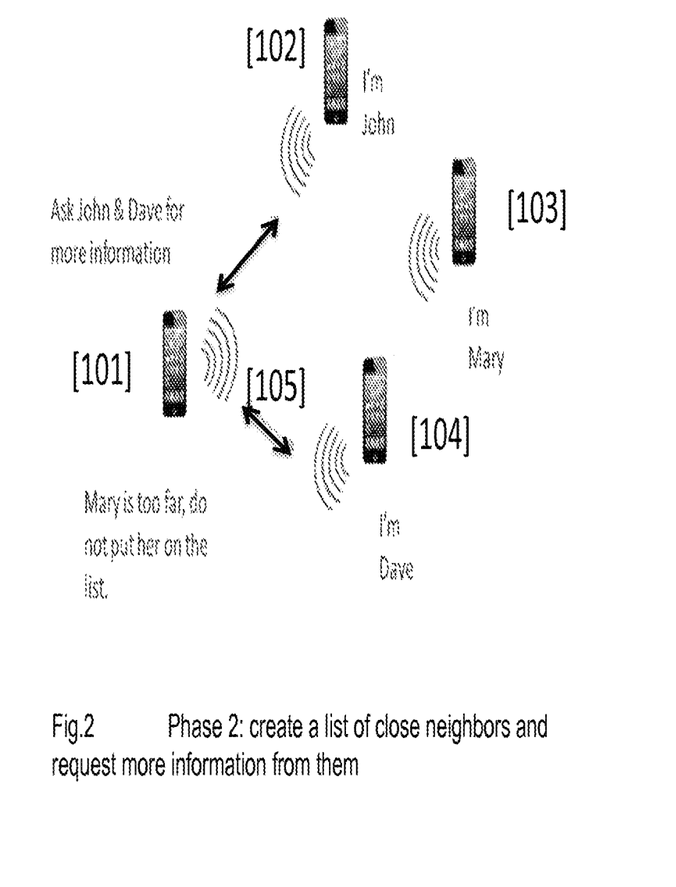
FIG. 2 depicts a scenario where a BLE device [101] is requesting additional data after discovery of neighboring devices in accordance with the embodiments.

FIG. 2 continues to illustrate a realization of a Bluetooth 4.0 LE meshed ad-hoc network as depicted in FIG. 1. The diagram depicts a scenario, where device 101 after completing its discovery cycle of other BLE neighboring nodes may request additional information from the nodes identified on its "nearby device" list. This request may be initiated on demand. The resulting report is referred to as "extended report". An exemplary structure is provided in FIG. 4*b* with the Information Container Structure 402 and in FIG. 4*c* with the Extended Report data sample 403.

Further to FIG. 2, upon demand for an extended report on a specified nearby device, the device 101 first checks if a required extended report already exists as a result of a previous enquiry. If this data is not available, device 101 may establish a connection with the specified nearby device and extract information for the extended report. Upon receiving the data the connection is closed, the information associated with this device is stored, and an extended report may be provided in response to the request.

Figure 3:
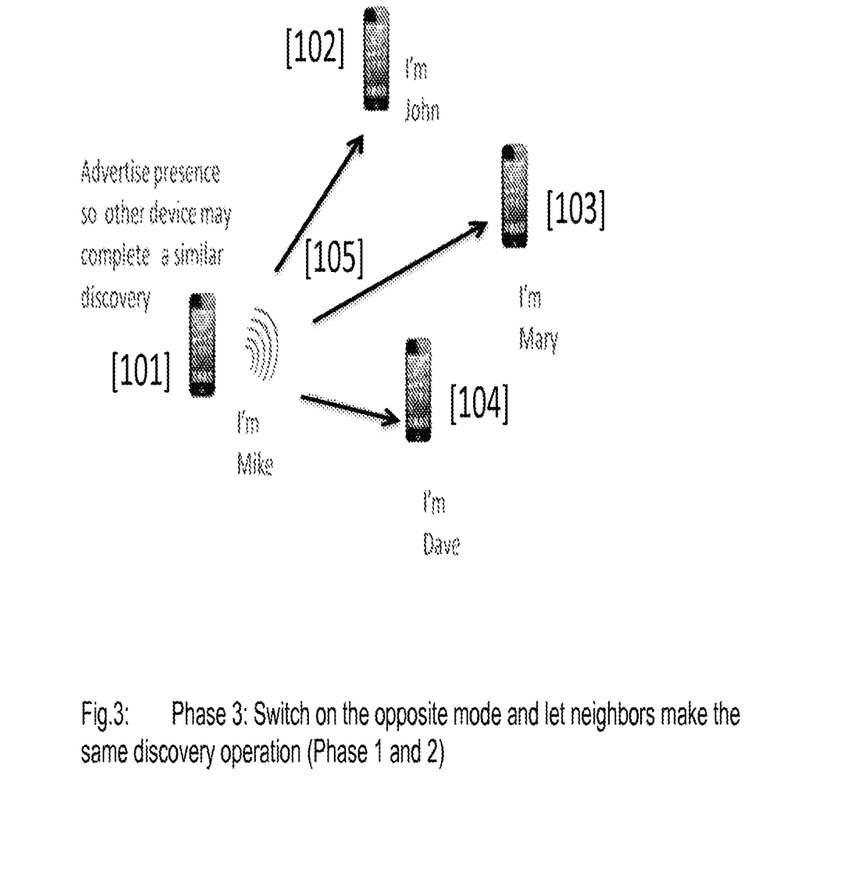
FIG. 3 depicts a scenario where a BLE device [101] advertises its presence by broadcasting a universally unique identifier or UUID in accordance with the embodiments.

FIG. 3 continues to illustrate a realization of a Bluetooth 4.0 LE meshed ad-hoc network as depicted in FIG. 1. The diagram depicts a scenario, where device 101 switches upon demand into an advertising mode and broadcasts application-specific UUID and associated advertising data so it can be discovered by scanning BLE devices in communication range. Device 101 reports when the advertising mode has timed out or has been canceled on demand. In advertising mode, a BLE device supports BLE connectivity requests to provide extended report data.

FIG. 4*a* provides an exemplary short report format. Short report information is limited by the amount of data that can be integrated in the BLE advertising package.

Figure 4B:
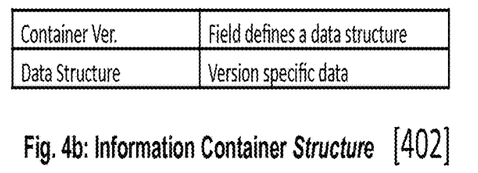
Figure 4C:
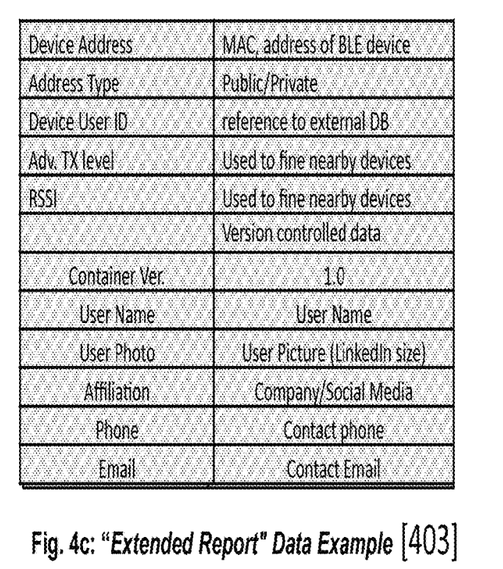

FIG. 4*b* provides a generic structure for an information container structure 402 that may be appended to a short report to arrive at an extended report. An information container is a version controlled data structure. FIG. 4*c* provides an exemplary embodiment of an extended report 403.

Figure 5:
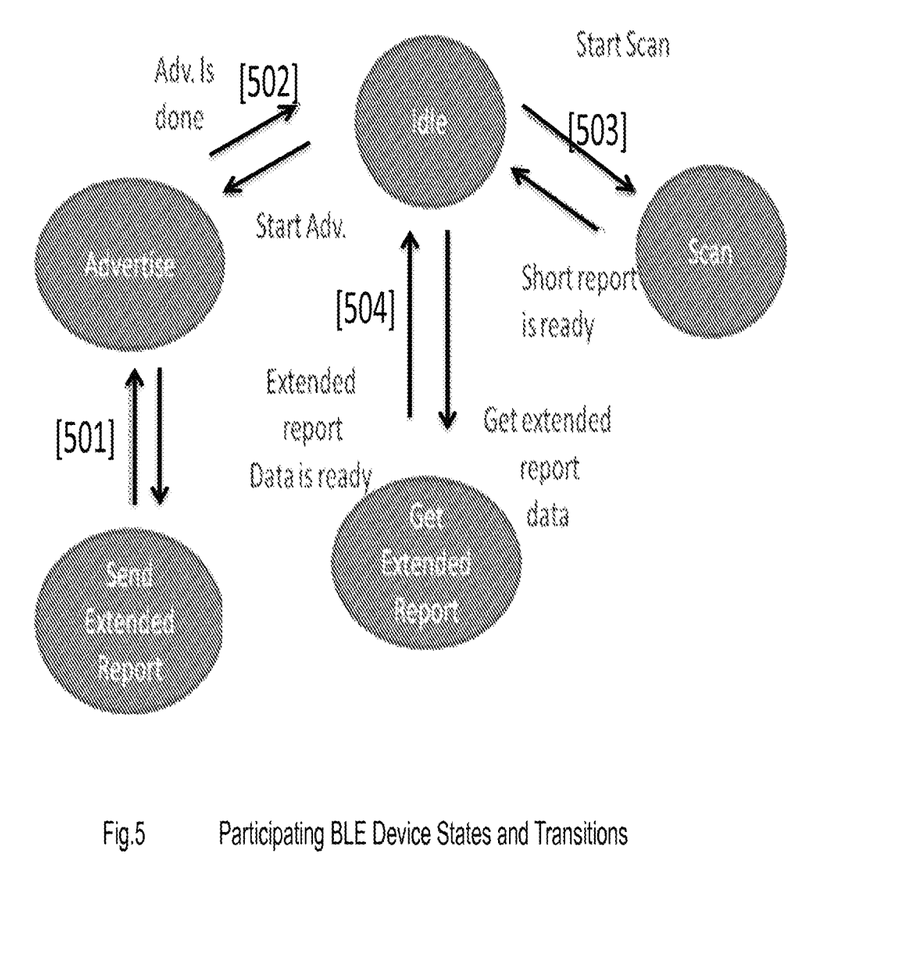
FIG. 5 depicts the different modes that a participating BT 4.0 node may assume in accordance with the embodiments.

FIG. 5 depicts the various possible states a BLE device can assume and their transitions under control of a candidate presence list (CPL) application software.

In one embodiment the SPC software program installed on a first BLE enabled device may recognize a second SPC enabled BLE devices in communication range and alert the user of the first device with visual and textual displays comprising at least the name and picture of the user of the detected device and it may issue an acoustical sonification indicating an approximate distance to the discovered device.

In one embodiment the SPC software program installed on a first BLE enabled device may recognize a multitude of SPC enabled BLE devices in communication range and alert the user of the discovered devices with visual and textual displays comprising at least the names and pictures of the users of the detected devices.

In one embodiment the SPC software program may report events of discovering neighboring devices and their exchanged data to a Central User Database.

In one embodiment a Central User Database is provided access through Internet cloud based communications that receives and records presence data from the local SPC application software instantiations for analysis and sharing purposes.

In an embodiment, the central database may be functioning as a social media aggregation engine and database, gathering social media data about individuals from social media applications as used for example, but not limited to, in retail business, entertainment and/or sports events where they are used to provide customers with a premium service and communications.

Figure 6:
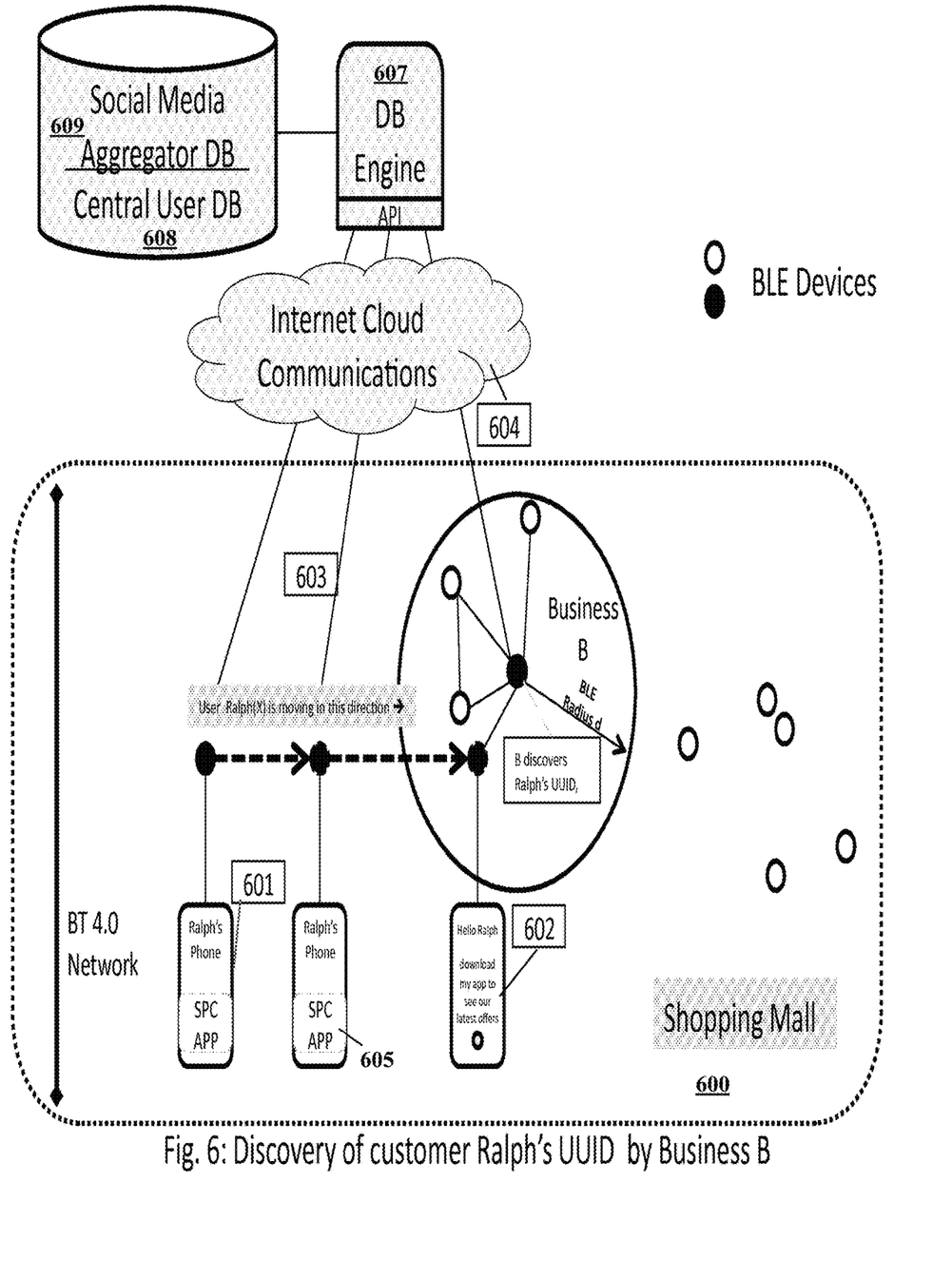
FIG. 6 depicts a use case illustrating a business discovering an approaching potential customer in accordance with the embodiments.

FIG. 6 depicts a use case in a shopping mall scenario. The illustration comprises:
- a. A shopping mall 600 where a business B is scanning for BLE customers such as customer "Ralph" who owns device 601
- b. Customer Ralph and his device 601 is approaching business B
- c. A central user database 608 containing presence data for BLE devices that have downloaded and installed the SPC App 605
- d. The additional Social Media Aggregator DB function 609 of the central user DB 608.
- e. A DB engine 607 that controls access to and storage logic for the central databases
- f. An Internet Communication Network (Cloud) 604

In an embodiment customer device 601 and business B are interfacing the central User database 608 to upload presence information, social media data, location, time and event information, while customer device 601 is approaching business B. Further in the embodiment business B discovers the UUID of customer device 601 when customer device 601 comes within the BLE communication range of business B, and directs an advertisement 602 to customer device 601 soliciting download of a business B customized web application to conduct a sale.

Figure 7:
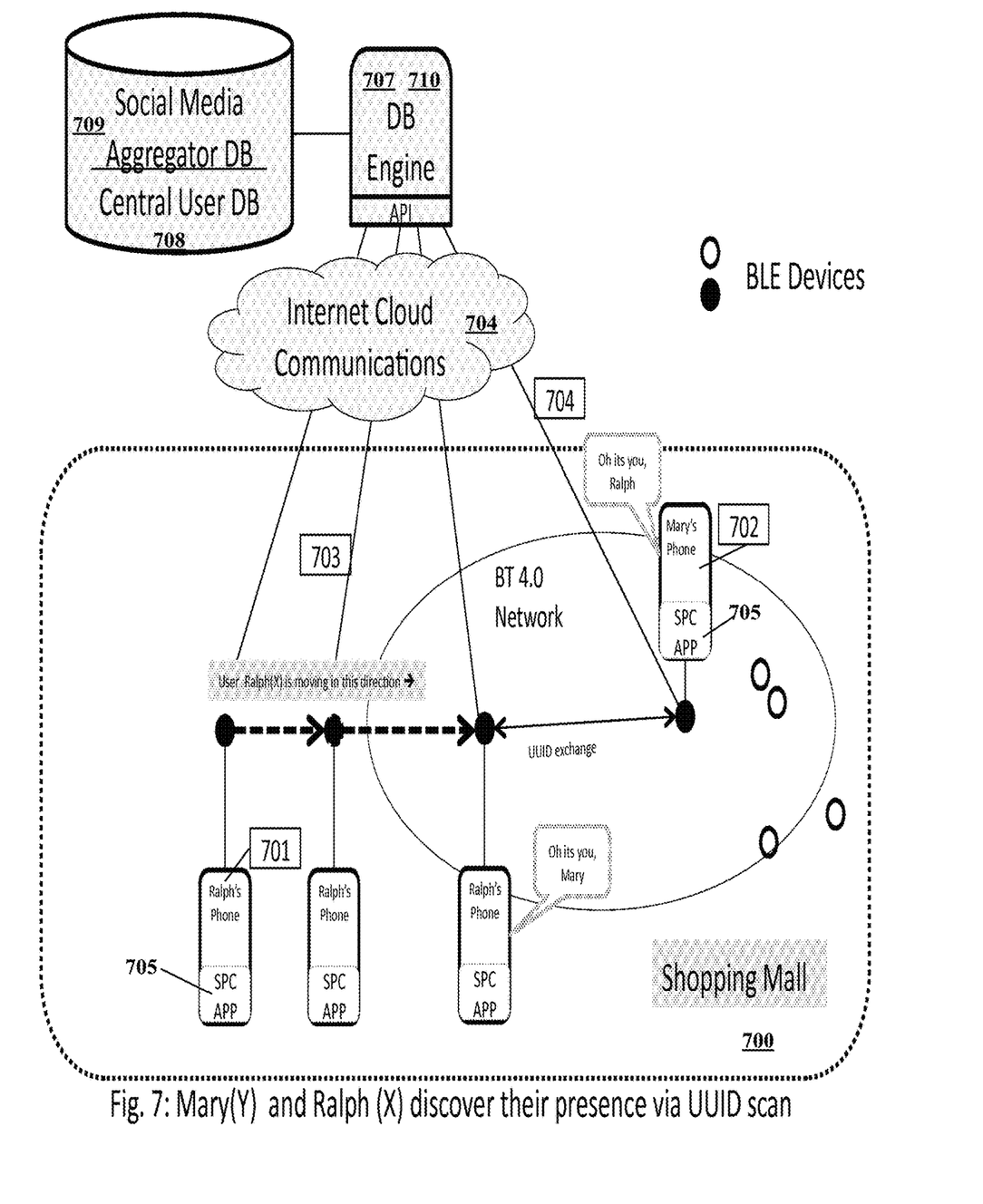
FIG. 7 depicts a use case where two people discover each other in physical proximity through the use of BLE UUID in accordance with the embodiments.

FIG. 7 depicts a use case in a shopping mall 700 scenario where two people (Ralph and Mary via their mobile devices respectively) (701,702) who may have had to this point a virtual relationship over social media communications, meet physically in the mall alerted by their SPC Application 705 upon discovery of a UUID. Through interfacing the central user database 708 via communication links 703, cloud communications network 704, and database engine 707 they (Ralph and Mary via their devices 701 and 702) may quickly retrieve additional information about each other presented on their mobile devices 701 and 702.

Further in an embodiment, the social media aggregation database engine 607 or 707 may employ forensic software programs 710 to aggregate and analyze data received from social media applications.

In an embodiment the central social media aggregation database engine 607 707 may be used to keep track of where a person goes, and how much time an individual spends in a particular location, and provide this data in form of a histogram showing in chronological order the time-location trace of an individual.

In an embodiment the central social media aggregation database engine 607 or 707 may be used by commercial social media applications to obtain tracking data and personal data of customers in BLE proximity to provide direct advertisements to the customer based on parameters comprising time, tracking and buying history, and UUID exchanged data revealing the customer's desire for certain products.

Further in an embodiment, the social media aggregation database engine 607 or 707 may be used for on-demand query of individuals comprising their current location, previous locations, and time spent in previous locations.

In an embodiment, the social media aggregation database 609 or 709 may be used to identify a multitude of individuals (swarm) who display similar or same behavioral patterns, for example in a shopping mall, and to provide progressive information of their (the swarm's) movements.

In an embodiment, the social media aggregation database engine 607 or 707 may use web crawling techniques to obtain social media data from a multitude of social media sites.

Further in an embodiment, when customers download and install social media applications, a cookie may be installed on the customer's communication device to prompt for permission for the application to upload social and behavioral data to a social media aggregation data base such as databases 609 or 709.

Those with ordinary skill in the art may appreciate that the elements in the figures are illustrated for simplicity and clarity and are not necessarily drawn to scale. For example, the dimensions of some of the elements in the figures may be exaggerated, relative to other elements, in order to improve the understanding of the present invention.

In some embodiments, described technology may be applied to environments and devices comprising transducers or earphones or wristwatches of the following categories:

Transducers:
  Bone conduction, Transdermal conduction, Magnetic transducers, Optical transducers, such as Fiber-Optic Acoustic Sensors (FOAS), Electromagnetic Acoustic Transducer (EMAT), Piezoelectric Transducers (can make contact or be used in a non-contact enablement) Omni-directional and directional transducers, Earphones:
Canal phone
Headphone
Earphone
Mono Acoustic Earphone
Stereo Acoustic Earphone
Binaural Earphone Hearing aid
PSAP (assertive listening devices)
Glasses (such as Google Glass)
In Canal Earphone
In Concha Earphone
Behind The Ear (BTE devices) Earphone
Active Glasses (such as Google Glass)
Heads up display
An electrode array, which is a group of electrodes that collects the impulses a the stimulator and sends them to different regions of the auditory nerve.
Wrist watches
Time Pieces
Heart Monitors
Fitness watches
Wrist wrapped monitoring devices In some embodiments, a Voice Identification Service as described in U.S. Non-Provisional application Ser. No.

14/475,556 can be used to assist with identification of multiple speaking people in a real time situation.

Figure 8:
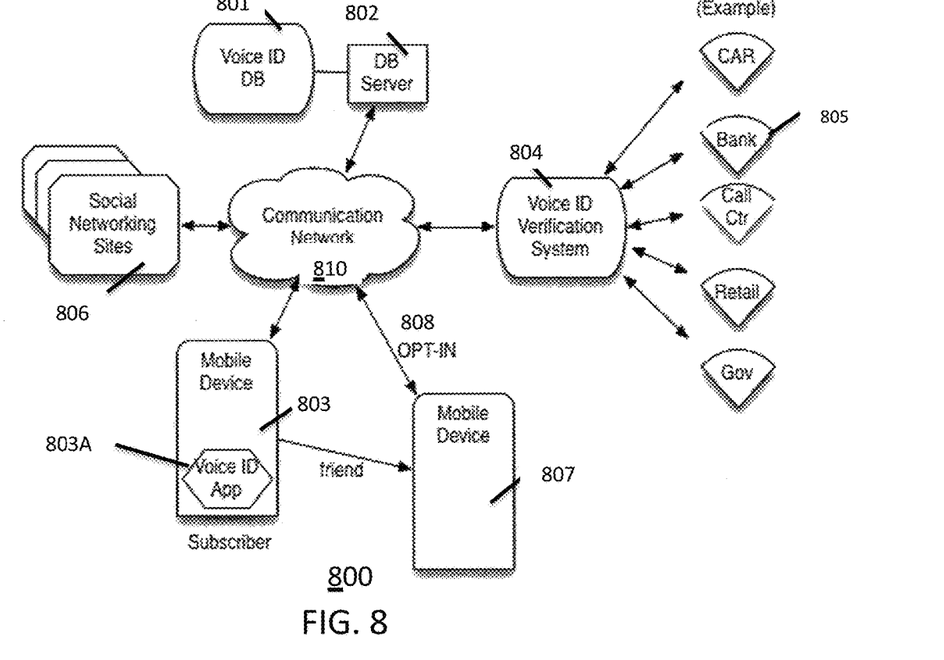
FIG. 8 is a depicts a Voice-ID network and its functions in accordance with an exemplary embodiment.

For example with reference to FIG. 8, in some embodiments, FIG. 8 illustrates a realization of a Voice-ID network system 800 according to an embodiment of the present embodiments. As shown in FIG. 8, the components of the Voice-ID network include:

- a voice identifier database 801 that contains the Voice IDs of opted in Voice-ID network subscribers,
- a database server 802 that controls the opt-in procedure,
- a communications network 810,
- a voice ID App 803A that is installed on a mobile device 803 to deliver visual profile information and persona authentication in the vicinity of the device and controls the recording and delivery of voice samples to create voice prints.
- a social media service (e.g., social networking sites or applications) 806 to communicate with other people that in conjunction with the voice identifier database 801 identifies other participants made available via the web or other interconnection means,
- An ID Verification Service System 804 that provides an interface to a multitude of users in need of ID verification 805
- At least one local mobile device 807 having a microphone and providing an established social media connection (e.g., friend) to the voice ID App 803A The Voice IDs stored in the voice identifier database 801 are also referred to as voice prints or voiceprints. The voiceprint is an efficient distillation of the speech of a talker which contains information about his or her identity, but which does not necessarily contain information about the content of the speech used to make the voiceprint. The voice prints include 1) a voice sample, for example, a spoken utterance, or phrases, digitally captured and stored on media, 2) a profile associated with the voice sample (described below), and optionally 3) device specific information, for example, a global positioning system (GPS) location, a Wi-Fi network, a MAC address, an IP address, and a unique device identifier, such as provided by the mobile device running the voice ID App 803A.

The profile can include information such as a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record. The aforementioned list of profile information is not meant to be exhaustive and only provides a sample of the types of information that can be used in the embodiments herein. As discussed later, such profile information can be used to corroborate an identity.

In the modern collection of algorithms for analyzing audio and speech signals, one aspect of the embodiments is a method to identify the talker of any particular utterance, independent of the information contained in the transcription of that utterance. That is, the talker is identified on only the characteristics of that person's voice, and not on the content or phrase of a spoken utterance. Also, in face-to-face interactions with other people the method described herein identifies information about the people whose voice are captured and/or engaging in a spoken interchange (There might be a mix of people, for instance in a conference room which includes people on a speaker phone, or in a conference setting with some people at a remote site). The Voice-ID network system of FIG. 8 obtains in near real-time the ID, profile and personal information of individuals merely by capturing their voice prints. This greatly enhances the ability for people to socialize and interact in a variety of situations.

Another aspect of the embodiments is the building and updating of a large and secure voice identifier database 801 of voice prints through the utilization of social media, and further incorporating the voice prints to enable enhanced social media value and security. The Voice ID database query system consists of a database that contains secured and encrypted voice ID and other profile data for opted-in individuals, an acquisition method for such voice ID and other profile data for individuals through the use of social networking capabilities, an ID verification system that is used both in social networking as well as commercial transactions to deliver the ID of humans based on their voice samples, and a mobile application (referred to as VIDA in the following) to facilitate the recording and translation of voice samples into voice ID data and profile data for the individual recorded, and which provides a visual representation of the data obtained. Once configured, this database allows for a novel ID verification service based on capturing voice samples that benefits a multitude of users ranging from financial institutions to the control of set top boxes and vehicle access, to name a few. The large scale building up of the voice ID entries and the voice identifier database 801 is further achieved through the exploitation of contact and friends lists that are part of social networking or social media. Voice identification is performed through a profile searching of social media. This efficient searching identifies voice samples of unknown talkers through access of contact or friends lists of a device used to capture the voice samples associated with a user of the device by way of the voice print.

The convergence of the social media interactivity and the ability of speaker identification/verification systems offers a unique capability to deliver talker specific information to the listener in many situations. This information can be delivered via visual display, on a cell phone, pad, or computer devices. While Voice ID delivers identification of people with a high degree of probability it may become desirable in certain situations to have certainty in the speaker's identification to a point that the person's voice can be authenticated. For example, in a large meeting room it may be helpful to associate the voice ID of a speaker with the speaker's location in the room to clearly delineate who the ID'ed voice belongs to. In another situation, at the checkout point of a retail store it may be desirable that a customer can authenticate himself or herself just by delivering a voice sample, and thereby complete the payment of the merchandise. Or in a meeting room, when a person approaches another participant the device display can react and adjust social display properties to focus on the approaching person.

The ability to localize other people using Bluetooth 4.0 connectivity data enhances the Voice ID process significantly by increasing matching probabilities and allowing for authentication. These embodiments are leveraging the capabilities of a Bluetooth 4.0 system to narrow down the search space and to accomplish an accuracy of Voice Identification suitable for authentication. Bluetooth low energy, also known as Bluetooth 4.0 (BT 4.0), BLE, Bluetooth LE, and Bluetooth Smart, is a Bluetooth standard that is designed for ultra-low energy sensors requiring very little power. Some of the Bluetooth low energy devices that are already available include a variety of sports fitness sensors. In some embodiments, Bluetooth 4.0 is used in a meshed network configuration to connected personal communication devices and to exchange certain specific data relating to the owner of the device. This data is used to complement the voice identification process and to achieve authentication quality. In addition, BT 4.0 is used to compute the distance between two nodes based on signal quality (RSSI).

Figure 9:
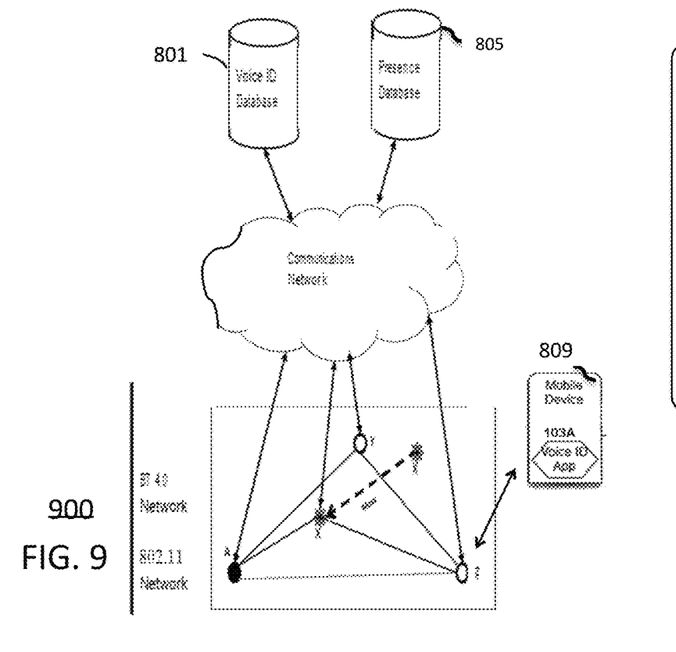
FIG. 9 depicts a method of Bluetooth 4.0 or WiFi triangulation to localize and track people who have been identified through biometric input in accordance with an exemplary embodiment.

FIG. 9 depicts a method of Bluetooth 4.0 or WiFi triangulation to localize and track people who have been identified through their biometric input such as a voiceprint. Recall, one objective achieved herein by way of the method and system disclosed is the interwork of Bluetooth 4.0 connection functions and data with Voice ID verification for persona authentication and localization. For instance, is the person whom the phone is capturing live voice samples from, an individual which the user of the phone knows or is able to infer from social media and established social connections. Aside from social media connections, the method and system herein includes location information to verify or corroborate the biometric input and accordingly the authentication of that person's identify. For example, upon capturing a voice sample, the device checks on a friend list and on social media to assess whether a friend is scheduled to be at an event. The device, or the server, then narrows down the searching of a voice print match to the narrowed presence list identifying which individuals may be present at the location.

For assessing a person's location, the VIDA mobile application 103A in one configuration in a mobile device 809 in system 900, measures the BT 4.0 received signal strength and computes an estimate of the distance to the UUID broadcasting BT 4.0 device. By having at least three VIDA enabled devices in 802.11 WiFi or BT 4.0 I-hop proximity, the VIDA application identifies and tracks the location and movement of other devices by means of triangulation. The accuracy of the localization increases with the number of VIDA enabled devices in the proximity. The outcome of the distance/localization calculation is reflected and shown on the presence screens of the devices by centering the display on the device user who may be closest in proximity. As illustrated in FIG. 9, this is achieved from a signal strength measurement to each of the mobile devices (see A, Y, Z), querying the voice ID database 801 for a potential location based on a presence profile maintained in the presence server 805 and the persona of the individual from social media, and comparing the location with the potential location to validate the authentication of the persona of the individual from the voice sample. The VIDA enabled devices 809 may be equipped with a GPS system (see FIG. 10; location unit 358). The on-board device GPS system may be used facilitating the activation and deactivation of the device BT 4.0 and 802.11 WiFi radios upon entering and leaving a building. For example, when entering a building the device 809 may be made aware of this event by its GPS system and may turn on its 802.11 or Bluetooth 4.0 radios. Upon leaving a building the device may turn off its 802.11 or Bluetooth 4.0 radios upon notification by its GPS system indicating re-synchronization with GPS satellites. The decision to turn on or off the 802.11 or Bluetooth 4.0 radios may be overridden by the device user.

A proximity analysis can be conducted to the local devices from the signal strengths received, which can include refining the presence list to include only devices that are in a specified distance range from corresponding distance estimates in view of the proximity analysis based on a voice quality metric, and capturing voice samples from the devices identified in the presence list for ensuring voice quality verification and authentication. The VIDA mobile application 103A conducts the proximity analysis by using the computed distance to other devices, derived from the BT 4.0 received signal strength indicator, and limit its presence list to those devices that are in a specified distance range. This may allow limiting the presence list to those users whose voices can be recorded with sufficient quality for Voice ID verification and authentication. The VIDA application 103A may continually and automatically record the surrounding audio field and upload the recording to a central database according to proximity and location.

Also, a time stamp is marked for each one or more voice samples captured from the devices, and the one or more voice samples can be time ordered according to the time stamp. This can be done by the devices individually or at the server which has group ID and time stamp information available. A speech to text conversion of the one or more voice samples is then performed according to the time ordering. This allows all participants in the area to receive a text of the conversation, with indication of who spoke (voice sample information) and when (a time stamp). In one arrangement, the VIDA mobile application 103A uses a probabilistic anti-model for the purpose of Voice Identification in the processing of voice recordings for speech to text conversion. The probabilistic anti-model for a particular device maybe set up in such a way that the voice of the device owner is ID'ed and time stamped as opposed to all other surrounding voices and audio. Applying an user specific probabilistic anti-model to each device in proximity of a device with the device user being the ID'ed and time stamped voice, then the resulting recordings of all devices that are participating in a conversation may be converted to a text file precisely reflecting all parties of a conversation with their time stamps and conversation text. Further, the recorded conversations of said users may be reconstituted to a single audio file composed of the identified and dominant voice segments of each user's recording.

In one arrangement, the VIDA enabled device 103A may solicit and recruit other non-registered devices to join the Voice ID verification network and download and execute the VIDA application. The recruiting includes establishing a Bluetooth connection with the unknown device broadcasting and receiving a BT 4.0 UUID with the Bluetooth MAC address of the unknown device, Interrogating cloud based database services and social media sites to find and match the UUID or BT 4.0 MAC address to a mobile phone number associated with the unknown device, prompting the unknown device to join the Voice ID network via a social media invocation such as a text message or similar including a link to the VIDA application, and using social media to establish a dialog with the user of the unknown device In an exemplary scenario the VIDA enabled devices may establish a connection with the unknown device using BT 4.0 UUID broadcasting and scanning. The received UUID of the unknown device may contain the Bluetooth address of that device. The VIDA application 103A may use the received UUID and Bluetooth 4.0 MAC address to search cloud based database services and social networking sites to match the UUID/MAC address to a mobile phone number. This may require that the user of the unknown device has previously registered his/her phone number with an online service or social media site. Once the search for a phone number is successful the VIDA application may prompt the unknown device to join the network via social media invocation such as text messaging or similar that includes a link to the VIDA application. Agreement to opt-in to the Voice ID network may be given via a special confirmation code or by accepting the download of the VIDA application.

Figure 10:
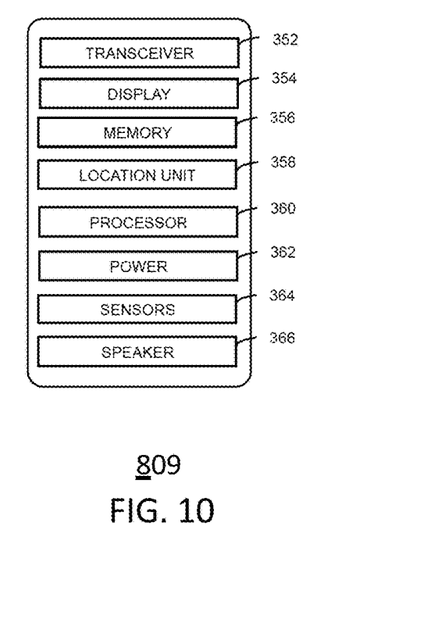
FIG. 10 is an exemplary mobile device for use with authentication and localization in accordance with an exemplary embodiment.

FIG. 10 depicts various components of a multimedia device 809 suitable for use for use with, and/or practicing the aspects of the inventive elements disclosed herein, though is not limited to only the methods or components shown or described. As illustrated, the device 809 comprises a wired and/or wireless transceiver 352, a user interface (UI) display 354, a memory 356, a location unit 358, and a processor 360 for managing operations thereof. The media device 300 can be any intelligent processing platform with Digital signal processing capabilities, application processor, data storage, display, input modality like touch-screen or keypad, microphones, speaker 366, Bluetooth, and connection to the internet via WAN, Wi-Fi, Ethernet or USB. This embodies custom hardware devices, Smartphone, cell phone, mobile device, iPad and iPod like devices, a laptop, a notebook, a tablet, or any other type of portable and mobile communication device. Other devices or systems such as a desktop, automobile electronic dash board, computational monitor, or communications control equipment is also herein contemplated for implementing the methods herein described. A power supply 362 provides energy for electronic components.

In one embodiment where the media device 809 operates in a landline environment, the transceiver 352 can utilize common wire-line access technology to support POTS or VoIP services. In a wireless communications setting, the transceiver 352 can utilize common technologies to support singly or in combination any number of wireless access technologies including without limitation Bluetooth™, Wireless Fidelity (WiFi), Worldwide Interoperability for Microwave Access (WiMAX), Ultra Wide Band (UWB), software defined radio (SDR), and cellular access technologies such as CDMA-1x, W-CDMA/HSDPA, GSM/GPRS, EDGE, TDMA/EDGE, and EVDO. SDR can be utilized for accessing a public or private communication spectrum according to any number of communication protocols that can be dynamically downloaded over-the-air to the communication device. It should be noted also that next generation wireless access technologies can be applied to the present disclosure.

The power supply 362 can utilize common power management technologies such as power from USB, replaceable batteries, supply regulation technologies, and charging system technologies for supplying energy to the components of the communication device and to facilitate portable applications. In stationary applications, the power supply 362 can be modified so as to extract energy from a common wall outlet and thereby supply DC power to the components of the communication device 300.

The location unit 358 can utilize common technology such as a GPS (Global Positioning System) receiver that can intercept satellite signals and there from determine a location fix of the portable device 809. The controller processor 360 can utilize computing technologies such as a microprocessor and/or digital signal processor (DSP) with associated storage memory such a Flash, ROM, RAM, SRAM, DRAM or other like technologies for controlling operations of the aforementioned components of the communication device. The device 809 can further include at least one sensor 364 such as a microphone to capture a voice sample, a camera to capture an image, an iris scanner to capture an iris scan, or a fingerprint scanning device to capture a fingerprint. Other biometric inputs are contemplated and are not limited to those shown or described.

In some embodiments, the SPC software program installed on a first BLE enabled device may recognize a multitude of SPC enabled BLE devices in communication range and apply this information to narrow down the search space for a subsequent Voice identification and authentication, thereby increasing the probability of a match.

In an embodiment, the SPC software program installed on a first BLE enabled device may apply UUID obtained data from a second BLE enabled device to assist single or multi modality verification systems, thereby increasing the probability of a match.

Upon establishing a presence list the SPC application software may control the device to obtain voice signatures for each candidate on the nearby presence list by accessing a remote server using a TCP/IP connection.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

Those with ordinary skill in the art may appreciate that the elements in the figures are illustrated for simplicity and clarity and are not necessarily drawn to scale. For example, the dimensions of some of the elements in the figures may be exaggerated, relative to other elements, in order to improve the understanding of the present embodiments.

All documents referenced herein are hereby incorporated by reference.

I claim:

1. A device, comprising:
a memory having computer instructions; and
a processor coupled to the memory, wherein the processor executes the computer instructions thereby causing the processor to perform operations comprising:
generating a presence list associated with a plurality of discovered neighboring devices, wherein the presence list comprises each discovered neighboring device of the plurality of discovered neighboring devices and personal identification data for each user associated with each discovered neighboring device;
transferring biometric and personal data to or from the device or to or from one of the plurality of discovered neighboring devices; and
obtaining a voice signature for each candidate on the presence list by accessing a remote server that specifies an optimized search field based on the personal identification data, the biometric and personal data, or a combination thereof.

2. The device of claim 1, wherein the operations further comprise discovering the neighboring device.

3. The device of claim 1, wherein the operations further comprise obtaining presence data from the plurality of discovered neighboring devices.

4. The device of claim 3, wherein the operations further comprise facilitating prequalification of voice identification verification and authentication based on the presence data.

5. The device of claim 4, wherein the operations further comprise narrowing a search space to increase a probability of a hit based on the prequalification of the voice identification verification and the authentication.

6. The device of claim 1, wherein the operations further comprise identifying each user associated with each discovered neighboring device based on a voiceprint associated with each user.

7. The device of claim 1, wherein the operations further comprise facilitating control of the device based on the presence list.

8. The device of claim 1, wherein the operations further comprise calculating a distance to a neighboring device of the plurality of discovered neighboring devices.

9. The device of claim 8, wherein the operations further comprise classifying the neighboring device in the presence list based on the distance.

10. The device of claim 8, wherein the operations further comprise comparing the distance with a pre-specified distance value.

11. The device of claim 10, wherein the operations further comprise assigning a nearby device attribute to the neighboring device if the distance is less than or equal to the pre-specified distance value.

12. The device of claim 10, wherein the operations further comprise assigning a present device attribute if the distance is greater than the pre-specified distance value.

13. A method, comprising:
providing, by utilizing instructions from a memory that are executed by a processor of a device, a presence list associated with a plurality of discovered neighboring devices in range of the device, wherein the presence list comprises each discovered neighboring device of the plurality of discovered neighboring devices and personal identification data for each user associated with each discovered neighboring device;
transmitting biometric and personal data to or from the device or to or from one of the plurality of discovered neighboring devices; and
retrieving a voice signature for each candidate on the presence list by accessing a remote server that specifies an optimized search field based on the personal identification data, the biometric and personal data, or a combination thereof.

14. The method of claim 13, further comprising receiving advertising information from a neighboring device of the plurality of discovered neighboring devices.

15. The method of claim 13, further comprising updating the presence list based on proximity criteria.

16. The method of claim 13, further comprising adjusting an attribute of a neighboring device of the plurality of discovered neighboring devices in the presence list based on proximity criteria.

17. The method of claim 13, further comprising generating the presence list based on information extracted from an advertising payload.

18. The method of claim 13, further comprising categorizing each neighboring device of the plurality of discovered neighboring devices as either a nearby device or a present device.

19. The method of claim 13, further comprising capturing an audio sample of a user associated with the device.

20. A method, comprising:
providing, by utilizing instructions from a memory that are executed by a processor of a device, a presence list associated with a plurality of discovered neighboring devices in range of the device, wherein the presence list comprises each discovered neighboring device of the plurality of discovered neighboring devices and personal identification data for each user associated with each discovered neighboring device; and
retrieving a voice signature for each candidate on the presence list by accessing a remote server that specifies an optimized search field based on the personal identification data, biometric and personal data, or a combination thereof.

* * * * *